US008965945B2

(12) United States Patent
Lutz

(10) Patent No.: US 8,965,945 B2
(45) Date of Patent: Feb. 24, 2015

(54) APPARATUS AND METHOD FOR PERFORMING FLOATING POINT ADDITION

(75) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 902 days.

(21) Appl. No.: 12/929,827

(22) Filed: Feb. 17, 2011

(65) Prior Publication Data
US 2012/0215823 A1 Aug. 23, 2012

(51) Int. Cl.
G06F 7/38 (2006.01)
G06F 7/42 (2006.01)
G06F 7/485 (2006.01)
G06F 7/57 (2006.01)
G06F 7/76 (2006.01)

(52) U.S. Cl.
CPC ........ *G06F 7/485* (2013.01); *G06F 7/57* (2013.01); *G06F 7/76* (2013.01)
USPC .......................................... 708/501; 708/505

(58) Field of Classification Search
CPC .............................. G06F 7/5443; G06F 7/3828
USPC .......................................... 708/523, 501, 505
See application file for complete search history.

(56) References Cited

U.S. PATENT DOCUMENTS

| 4,969,118 | A   | * | 11/1990 | Montoye et al. ........... 708/501 |
| 5,010,508 | A   | * | 4/1991  | Sit et al. ................... 708/505 |
| 5,631,859 | A   |   | 5/1997  | Markstein et al. |
| 5,996,066 | A   | * | 11/1999 | Yung ........................ 712/221 |
| 6,085,208 | A   | * | 7/2000  | Oberman et al. ........... 708/205 |
| 6,223,198 | B1  | * | 4/2001  | Oberman et al. ........... 708/620 |
| 6,594,679 | B1  |   | 7/2003  | Lee et al. |
| 7,225,323 | B2  | * | 5/2007  | Siu et al. .................. 712/222 |
| 7,296,048 | B2  |   | 11/2007 | Ohmi et al. |
| 7,437,400 | B2  |   | 10/2008 | Lutz et al. |
| 7,668,892 | B2  |   | 2/2010  | Lutz et al. |
| 8,078,660 | B2  | * | 12/2011 | Quinnell et al. ............ 708/501 |
| 8,239,440 | B2  |   | 8/2012  | Brooks et al. |
| 2002/0107900 | A1 |   | 8/2002  | Enenkel et al. |

(Continued)

OTHER PUBLICATIONS

U.S. Appl. No. 12/585,668, Lutz, filed Sep. 21, 2009.

(Continued)

*Primary Examiner* — Chuong D Ngo
(74) *Attorney, Agent, or Firm* — Nixon & Vanderhye P.C.

(57) ABSTRACT

An apparatus and method are provided for performing an addition operation on operands A and B in order to produce a result R, the operands A and B and the result R being floating point values each having a significand and an exponent. The apparatus comprises prediction circuitry for generating a shift indication based on a prediction of the number of leading zeros that would be present in an output produced by subjecting the operands A and B to an unlike signed addition. Further, result pre-normalization circuitry performs a shift operation on the significands of both operand A and operand B prior to addition of the significands, this serving to discard a number of most significant bits of the significands of both operands as determined by the shift indication in order to produce modified significands for operands A and B. Operand analysis circuitry detects, with reference to the exponents of operands A and B, the presence of a leading bit cancellation condition, and addition circuitry is configured, in the presence of the leading bit cancellation condition, to perform an addition of the modified significands for operands A and B, in order to produce the significand of the result R. Such an approach provides a particularly simple and efficient apparatus for performing addition operations.

20 Claims, 8 Drawing Sheets

(56) References Cited

U.S. PATENT DOCUMENTS

| | | |
|---|---|---|
| 2004/0122886 A1* | 6/2004 | Gerwig et al. ............... 708/523 |
| 2005/0144214 A1* | 6/2005 | Datta et al. ................... 708/523 |
| 2006/0117080 A1 | 6/2006 | Lutz et al. |
| 2006/0136543 A1 | 6/2006 | Lutz et al. |
| 2006/0149803 A1 | 7/2006 | Siu et al. |
| 2008/0256161 A1 | 10/2008 | Quinnell et al. |
| 2009/0150654 A1* | 6/2009 | Oberman et al. ............. 712/221 |
| 2009/0248779 A1 | 10/2009 | Brooks et al. |
| 2010/0312812 A1 | 12/2010 | Wang |
| 2013/0282784 A1 | 10/2013 | Oliver et al. |

OTHER PUBLICATIONS

U.S. Appl. No. 12/588,962, Lutz, filed Nov. 3, 2009.

Naini et al., 1-GHz HAL SPARC64 Dual Floating Point Unit with RAS Features, *IEEE Computer Society*: 12 pages, 2003.

Farmwald, "On the Design of High Performance Digital Arithmetic Units", *Lawrence Livermore National Laboratory (Circulation Copy)*, Aug. 1981, 106 pages.

Hinds et al., "A Small and Fast Leading One Predictor Corrector Circuit", *Arm Ltd.*, 2005, 5 pages.

Schmookler et al., "Leading Zero Anticipation and Detection—A Comparison of Methods", *IEEE*, 2001, pp. 7-12.

Office Action mailed Feb. 25, 2013 in co-pending U.S. Appl. No. 12/585,668.

UK Search Report dated May 10, 2012 in GB1200822.3.

Huang et al., "A New Architecture for Multiple-Precision Floating-Point Multiply-Add Fused Unit Design", *IEEE Symposium on Computer Arithmetic—Computer Society*, 2007, (8 pages).

Schwarz et al., "Hardware Implementations of Denormalized Numbers", 9 pages, 2003.

Office Action mailed Oct. 5, 2012 in co-pending U.S. Appl. No. 12/585,668.

Office ACtion mailed Oct. 17, 2012 in co-pending U.S. Appl. No. 12/585,668.

Office Action mailed Nov. 30, 2012 in co-pending U.S. Appl. No. 12/585,668.

Notice of Allowance mailed Feb. 8, 2013 in co-pending U.S. Appl. No. 12/588,962.

Office Action mailed Mar. 4, 2014 in U.S. Appl. No. 12/585,668.

Office Action mailed Jun. 24, 2014 in co-pending U.S. Appl. No. 12/585,668, pp. 1-16.

* cited by examiner

APPARATUS AND METHOD FOR PERFORMING FLOATING POINT ADDITION

BACKGROUND OF THE INVENTION

1. Field of the Invention

The present invention relates to an apparatus and method for performing an addition operation on operands A and B in order to produce a result R, the operands A and B and the result R being floating point values each having a significand and an exponent.

2. Description of the Prior Art

A floating point number can be expressed as follows:

$$\pm 1 \cdot x * 2^y$$

where: x=fraction
1.x=significand (also known as the mantissa)
y=exponent

Floating point addition can take two forms, namely like-signed addition (LSA) or unlike-signed addition (USA). An LSA operation is performed if two floating point operands of the same sign are to be added, or if two floating point operands of different signs are to be subtracted. Similarly, a USA operation is to be performed if two floating point operands of different sign are to be added, or if two floating point operands of the same sign are to be subtracted. When referring in the present application to the addition of floating point operands and the addition of the significands of such operands, this should be taken as collectively referring to LSA or USA computations, and accordingly it will be appreciated that such a term covers both addition and subtraction processes.

Typically a processor will have a number of pipelined units for performing different data processing operations. One such pipelined unit is an adder unit which comprises a number of pipeline stages for performing addition operations. Floating point addition consists of a number of stages, namely (1) exponent analysis and difference computation, (2) operand alignment, (3) addition (which may include rounding injection), and (4) normalization. For many years the state of the art in adder pipelines has involved the provision of two separate paths for at least part of the addition process, one being referred to as the near path and the other being referred to as the far path. In particular such a near/far path split can save a clock cycle in the addition process, based on the observation that nontrivial alignment and nontrivial normalization are mutually exclusive.

Hence, the near path is used for USA operations involving operands whose exponents are equal or differ by one, these operations having the potential to cause some cancellation of leading bits of the significand. Such differences do no require rounding, but they do require normalization after the addition. The far path is then used for all other USA operations and for all LSA operations, and requires circuitry for performing alignment and rounding, but only requires trivial (1-bit) normalization.

Such a split adder pipeline was first published in the PhD thesis "On the Design of High Performance Digital Arithmetic Units, by P Farmwald, University of California Livermore, 1981, and has been refined in several subsequent designs, see for example the paper entitled "1-GHz HAL SPARC64 Dual Floating Point Unit with RAS Features" by A Naini et al, Proceedings of the 15$^{th}$ IEEE Symposium on Computer Architecture, 2001, and also commonly-owned U.S. Pat. No. 7,437,400, the entire contents of which are hereby incorporated by reference.

One common form of operation involving an addition is a multiply-accumulate operation, taking the form A+L*M, where the multiplication result of the operands L and M form the second operand B for the addition. With the publication of the IEEE 754-2008 Standard, fused multiply accumulate (FMA) operations (also referred to herein as fused multiply add operations) have become a requirement for floating point units, an FMA operation requiring the unrounded multiplication result to be added to the operand A, with rounding then performed in association with the output of the addition. Dedicated FMA pipelined units have been developed, but the provision of such a dedicated unit is costly. Typically such an FMA unit is also used to perform standard addition operations and standard multiplication operations, thereby avoiding the need for a separate adder unit and a separate multiplier unit, but due to the complexity of the FMA unit, an FMA unit will typically take longer to perform a standard addition operation than a dedicated adder unit, and will also typically take longer to perform a standard multiplication operation than a separate multiplier unit. Since most operations are not actually FMA operations, but instead involve standard additions and multiplications, this can have a significant performance impact on the floating point unit.

Another mechanism for performing an FMA operation is to use a separate multiplication unit to perform the multiplication of the operands L and M, and then forward the result unrounded to a separate adder unit to form the second operand to be added to the operand A, as for example described in commonly owned co-pending U.S. patent application Ser. No. 12/585,668, the entire contents of which are hereby incorporated by reference. However, when using the above described near/far path architecture for the adder unit, this causes problems in the operation of the near path. In particular, the problem is that the unrounded multiplication result used as one of the operands is twice the length of the result R, and hence can require rounding even if there is cancellation in the near path. As mentioned above a near path does not typically provide rounding circuitry, and the output of the addition needs to be normalized before rounding is performed. As a result it would be necessary to add another pipeline stage to the near path to allow rounding to be performed, and this would significantly impact the performance of the adder unit.

Accordingly, it would be desirable to provide an improved floating point adder unit for a data processing apparatus.

SUMMARY OF THE INVENTION

Viewed from a first aspect, the present invention provides apparatus for performing an addition operation on operands A and B in order to produce a result R, the operands A and B and the result R being floating point values each having a significand and an exponent, said apparatus comprising: prediction circuitry configured to generate a shift indication based on a prediction of the number of leading zeros that would be present in an output produced by subjecting the operands A and B to an unlike signed addition; result pre-normalization circuitry configured to perform a shift operation on the significands of both operand A and operand B prior to addition of the significands, the shift operation serving to discard a number of most significant bits of the significands of both operand A and operand B as determined by the shift indication in order to produce modified significands for operands A and B; oper- and analysis circuitry configured to detect, with reference to the exponents of operands A and B, the presence of a leading bit cancellation condition; and addition circuitry configured, in the presence of said leading bit cancellation condition, to perform an addition of the modified significands for operands A and B, in order to produce the significand of the result R.

In accordance with the present invention, prediction circuitry such as a leading zero anticipator circuit is used to generate a shift indication which is then used to pre-normalize the significand of the result by performing a shift operand on the significands of both input operands, with the extent of the shift being dependent on the shift indication produced by the prediction circuitry. If a leading bit cancellation condition is detected, then the addition circuitry is arranged to perform an addition using the modified significands output by the result pre-normalization circuitry, in order to produce the significand of the result. Such an approach provides an apparatus that is considerably simpler and smaller than a traditional prior art adder circuit of the type providing separate near and far paths.

The apparatus of the present invention is able to perform an addition when one of the input operands is the unrounded multiplication result of an earlier multiplier stage, thereby allowing fused multiply accumulate operations to be performed in a simple and efficient manner. However, it should be noted that even in embodiments where support for fused multiply accumulate operations is not required, significant benefits can still be achieved by arranging the adder circuitry in accordance with the apparatus of the present invention.

In one embodiment, the operand analysis circuitry detects the presence of the leading bit cancellation condition if the exponents of the operands A and B have the same value or have values differing by 1, and if an unlike signed addition is used to perform the addition operation on said operands A and B. In typical prior art adder circuits, such a leading bit cancellation condition would typically result in the near path of such a prior art adder circuit being used. However, in accordance with the embodiments of the present invention, there is no requirement for a separate near path, and instead the same addition circuitry that would be used for all other addition operations is also used in the presence of a leading bit cancellation condition, but with the significand of the result having been pre-normalized via the pre-normalization circuitry prior to the operation of the addition circuitry.

In one embodiment, the prediction circuitry computes the shift indication for a case where the unlike signed addition causes the smaller of operands A and B to be subtracted from the larger of operands A and B.

However, in one embodiment, a determination as to which of operands A and B is larger is not available at the time the prediction circuitry begins to compute the leading zero value, and the prediction circuitry is arranged to produce first and second candidate shift indications, the first candidate shift indication assuming operand A is larger than operand B and the second candidate shift indication assuming operand B is larger than operand A. Hence, such an approach allows the prediction circuitry to begin its operation before it is known which operand is the larger, thereby allowing an earlier determination of the number of leading zeros than would otherwise be possible.

In one such embodiment, the apparatus further comprises: larger operand detection circuitry for determining which of operand A and operand B is the larger operand; and selection circuitry responsive to the larger operand detection circuitry and configured to select as the shift indication the first candidate shift indication if operand A is the larger operand, and to select as the shift indication the second candidate shift indication if operand B is the larger operand. Hence, it can be seen that in such embodiments the operation of the prediction circuitry can occur in parallel with the operation of the larger operand detection circuitry, with a selection then taking place between the two candidate shift indications based on the output from the larger operand detection circuitry.

In one embodiment, the apparatus further comprises comparison circuitry configured to output a comparison result indicative of whether the least significant bit (LSB) of the exponent of operand A is the same as the least significant bit of the exponent of operand B. If the comparison result indicates that the LSB of the exponents are the same, the prediction circuitry computes the shift indication for a case where the unlike signed addition causes the smaller of operands A and B to be subtracted from the larger of operands A and B. However, if the comparison result indicates that the LSB of the exponents are not the same, the prediction circuitry computes the shift indication for a case where the unlike signed addition causes a one-bit right-shifted version of the smaller of operands A and B to be subtracted from the larger of operands A and B. As discussed earlier, the leading bit cancellation condition can occur if the exponents of the operands are equal, or if they have values differing by one. In accordance with the above embodiment, if the comparison result indicates that the exponents are not the same, then it is assumed that the exponents differ by one. This is a safe assumption to make, since if the leading bit cancellation condition is determined not in fact to be present, then the outputs of the result pre-normalization circuitry are not used by the addition circuitry, and hence the output of the prediction circuitry is effectively ignored.

In one embodiment, the addition circuitry is configured to perform injection rounding to add a rounding increment value during the addition, and the operation of the result pre-normalization circuitry prior to the addition circuitry ensures that the modified significands of operands A and B are correctly aligned for the injection rounding. This provides a significant performance benefit, since it avoids any need to provide additional rounding circuitry after the output of the addition circuitry as computed. This should be contrasted with the prior art arrangement using near and far paths, where, if fused multiply accumulate operations were to be supported, it would be necessary to add another pipeline stage to the near path to allow rounding to be performed after the addition has taken place.

In one embodiment, the addition circuitry comprises first addition circuitry configured to perform the addition using a first rounding increment value assuming no overflow condition is present, and second addition circuitry configured to perform the addition using a second rounding increment value assuming an overflow condition is present. In the presence of a leading zero correction condition, the addition circuitry is configured to output as the significand of the result R the result produced by the second addition circuitry from the modified significands of operands A and B. As will be understood by those skilled in the art, prediction circuits used to predict the number of leading zeros present in an output produced by subjecting the operands A and B to an unlike signed addition can in practice at most be one bit out in the predicted number of leading zeros. Typically this would require the provision of some correction circuitry to account for that possibility. However, in the above embodiment, this can automatically be taken care of due to the presence of the two addition circuits, in that if the predicted number of leading zeros is determined to be out by one, the output from the second addition circuitry is used to form the significand of the result.

There are a number of ways of detecting the leading zero correction condition, but in one embodiment, when said addition circuitry performs the addition of the modified significands for operands A and B, the leading zero correction condition is detected if a carry out is produced from the first addition circuitry.

In one embodiment, the apparatus further comprises: alignment circuitry configured to perform an alignment operation to align the significand of the smaller of operands A and B with the significand of the larger of operands A and B prior to addition of the significands; and the addition circuitry is configured, if said leading bit cancellation condition is not present, to perform an addition of the significands of operands A and B as aligned by the alignment circuitry. Hence, if the leading bit cancellation condition is not present, the output of the result pre-normalization circuitry is ignored, and instead the addition circuitry receives the significand of the larger operand, and the aligned significand of the smaller operand from the alignment circuitry.

In one embodiment, the alignment circuitry performs said alignment operation by performing a right shift operation on the significand of the smaller of operands A and B, with the number of bits of the shift being dependent on the difference between the exponents of operands A and B.

In one embodiment, the apparatus is configured as a series of pipeline stages, and the result pre-normalization circuitry is located in a pipeline stage prior to a subsequent pipeline stage in which the addition circuitry is located. Further, in one embodiment, said prediction circuitry is located in a preceding pipeline stage prior to the pipeline stage in which the result pre-normalization circuitry is located.

In one embodiment, the apparatus further comprises shift correction circuitry, responsive to detection of a subnormal condition, to perform a one-bit correction right shift of the modified significands for operands A and B prior to input of the addition circuitry. This then allows subnormals to be handled generally in the same manner as normal operands.

There are a number of ways to detect the subnormal condition, but in one embodiment the subnormal condition is detected if the exponent of the result R takes a predefined value. In one example implementation, this predefined value is an exponent value comprised of all zeros, for a double precision number this specifying an exponent of $e^{-1022}$, and in such instances the significand is of the form 0.xxx.

When one of the input operands to the apparatus is the result of a multiply operation performed on two floating point operands, and is supplied as an input unrounded, the final sum can actually achieve the result 4.0, due to the possibility that the unrounded multiplication result has an incorrect exponent (i.e. could be one higher than specified once that result is rounded). If a number near to the multiplication result is then subtracted from it via a USA operation, it is possible for the exponent of the result to be two higher than the exponent of the result associated with the default output of the addition circuitry. Such a scenario is referred to herein as a double overflow condition. In one embodiment, the apparatus further comprises result significand output circuitry, responsive to detection of a double overflow condition, to output all fraction bits of the significand of the result R as logic zero values irrespective of the output of the addition circuitry.

In one particular embodiment where the addition circuitry comprises first addition circuitry for performing the addition using a first rounding increment value assuming no overflow condition is present, and second addition circuitry for performing the addition using a second rounding increment value assuming an overflow condition is present, the double overflow condition is detected if a carry out occurs from the second addition circuitry when performing an unlike signed addition operation. Then, in the presence of the double overflow condition, the exponent of the result is set two greater than the exponent associated with the output from the first addition circuitry.

The prediction circuitry can take a variety of forms but in one embodiment comprises leading zero anticipation circuitry configured to compute, as the shift indication, a leading zero value indicative of the number of leading zeros that would be present in an output produced by subjecting the operands A and B to an unlike signed addition.

Viewed from a second aspect, the present invention provides a method of performing within a data processing apparatus an addition operation on operands A and B in order to produce a result R, the operands A and B and the result R being floating point values each having a significand and an exponent, said method comprising: generating a shift indication based on a prediction of the number of leading zeros that would be present in an output produced by subjecting the operands A and B to an unlike signed addition; employing result pre-normalization circuitry to perform a shift operation on the significands of both operand A and operand B prior to addition of the significands, the shift operation serving to discard a number of most significant bits of the significands of both operand A and operand B as determined by the shift indication in order to produce modified significands for operands A and B; detecting, with reference to the exponents of operands A and B, the presence of a leading bit cancellation condition; and arranging addition circuitry to be responsive to the presence of said leading bit cancellation condition to perform an addition of the modified significands for operands A and B, in order to produce the significand of the result R.

Viewed from a third aspect, the present invention provides apparatus for performing an addition operation on operands A and B in order to produce a result R, the operands A and B and the result R being floating point values each having a significand and an exponent, said apparatus comprising: prediction means for generating a shift indication based on a prediction of the number of leading zeros that would be present in an output produced by subjecting the operands A and B to an unlike signed addition; result pre-normalization means for performing a shift operation on the significands of both operand A and operand B prior to addition of the significands, the shift operation serving to discard a number of most significant bits of the significands of both operand A and operand B as determined by the shift indication in order to produce modified significands for operands A and B; operand analysis means for detecting, with reference to the exponents of operands A and B, the presence of a leading bit cancellation condition; and addition means for performing, in the presence of said leading bit cancellation condition, an addition of the modified significands for operands A and B, in order to produce the significand of the result R.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
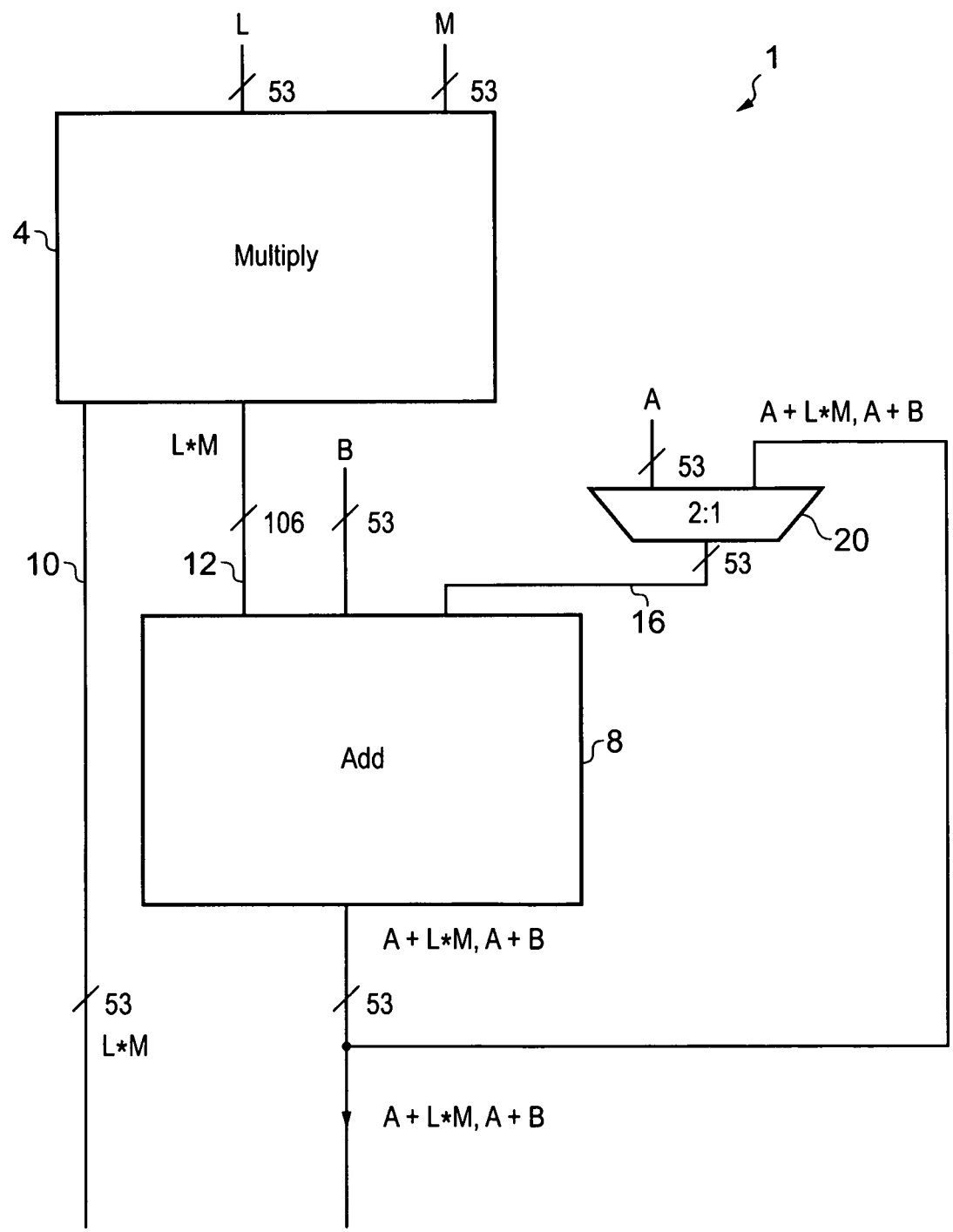
FIG. 1 schematically illustrates a fused multiply add processing unit in accordance with one embodiment.

FIG. 1 schematically illustrates a fused multiply add processing unit 1 that may be used as part of a floating point processing unit. Various elements of the fused multiply add unit shall be described below, although it will be appreciated that the floating point multiply add unit 1 would also include additional features and elements not illustrated in FIG. 1 for clarity. The fused multiply add unit 1 is illustrated as processing double precision operands having 53-bit significands, although the fused multiply add unit 1 could also process single precision operands with 24-bit significands (or floating point numbers represented using another floating point format having an N-bit significands).

The fused multiply add unit 1 includes multiplying circuitry 4 and adding circuitry 8. The multiplying circuitry 4 receives two operands L and M having 53-bit significands. The multiplying circuitry is responsive to a multiply instruction to multiply the operands L and M and to output on line 10 a normal, rounded, product L*M having a 53-bit significand. The multiply circuitry 4 is also responsive to a fused multiply add instruction to multiply the operands L and M to generate an unrounded product L*M having a 106-bit significand. The unrounded product L*M is transferred over bus 12 to the adding circuitry 8.

The adding circuitry 8 receives an operand A over bus 16. The operand A has a 53-bit significand. The adding circuitry also receives one or both of an operand B having a 53-bit significand and the unrounded product L*M having a 106-bit significand. The adding circuitry 8 is responsive to a fused multiply add instruction to add the operand A received over bus 16 to the unrounded product L*M received over bus 12. The adding circuitry is also responsive to an add instruction to add the operand A to the operand B. Regardless of which of the instructions is being executed, a rounded result value A+L*M or A+B is then output by the adding circuitry 8. The output of the adding circuitry 8 can either be sent to a register file (not illustrated) for storage or can be forwarded back to a multiplexer 20 where the output value can be selected for use as the operand A for a subsequent instruction.

Both the multiplying circuitry 4 and the adding circuitry 8 include circuitry for rounding floating point values (although the rounding circuitry of the multiply circuitry 4 is not used when the multiplying circuitry 4 is being used to execute a fused multiply add instruction). Rounding of floating point values is performed by reducing the number of bits of the significand, and adding a rounding value to the shortened significand so as to produce a value representable using the shorter significand. A method for performing rounding during the multiply stage 4 is described in US Patent Application 2006/0117080 A1, the contents of which are incorporated in their entirety herein by reference. A method for performing rounding during the adding stage 8 is described in US Patent Application 2006/0136543 A1, the contents of which are incorporated in their entirety herein by reference. These applications describe techniques for speeding up rounding of floating point values by incorporating the rounding into the multiply or add operations. Thus, the rounding circuitry described in the present application is not necessarily distinct from the parts of the multiply circuitry 4 or adding circuitry 8 that perform the multiply or add operations and could comprise at least some of the same circuitry, which may be selectively configured to perform rounding or not perform rounding.

As described above, the fused multiply add unit 1 executes a fused multiply add instruction in separate multiply and add stages. While this means that more processing cycles are required to execute a single fused multiply add instruction, the processing of a sequence of fused multiply add instructions, add instructions or multiply instructions is quicker as the processing of different instructions can be interleaved. The processing of a single multiply or add instruction is also quicker than in a prior art fused MAC unit as these can be executed using only one of the multiply or add circuits, not both. Simulation results have shown that the fused multiply add unit 1 can speed up processing of sequences of instructions by between 3% and 23% depending on the application being processed. The fused multiply add unit 1 is particularly efficient at calculating dot products of the form ax+by+cz+dw, since this requires a sequence of fused multiply add instructions.

A circuit of the form of FIG. 1 was described in commonly owned co-pending U.S. patent application Ser. No. 12/585,668, the entire contents of which are hereby incorporated by reference. The multiplier circuit 4 can take a variety of forms, provided it is able to output an unrounded multiplication result for input to the adder 8 when executing a fused multiple-add instruction. One example of a suitable multiplier circuit is described in commonly-owned copending U.S. patent application Ser. No. 12/588,962, the entire contents of which are hereby incorporated by reference, but when using such a multiplier as part of a fused multiply add operation no rounding injection would be performed prior to forwarding the multiplication result on to the adder.

As regards the construction of the adding circuit 8, the use of a traditional structure employing separate near and far paths can give rise to performance issues when executing fused MAC instructions. In particular, the unrounded multiplication result used as one of the operands is twice the length of the result R, and hence can require rounding even if there is cancellation in the near path. However the near path does not typically provide rounding circuitry, and the output of the addition need to be normalized before rounding is performed. As a result it would be necessary to add another pipeline stage to the near path to allow rounding to be performed, and this would significantly impact the performance of the adding circuit.

Figure 2:
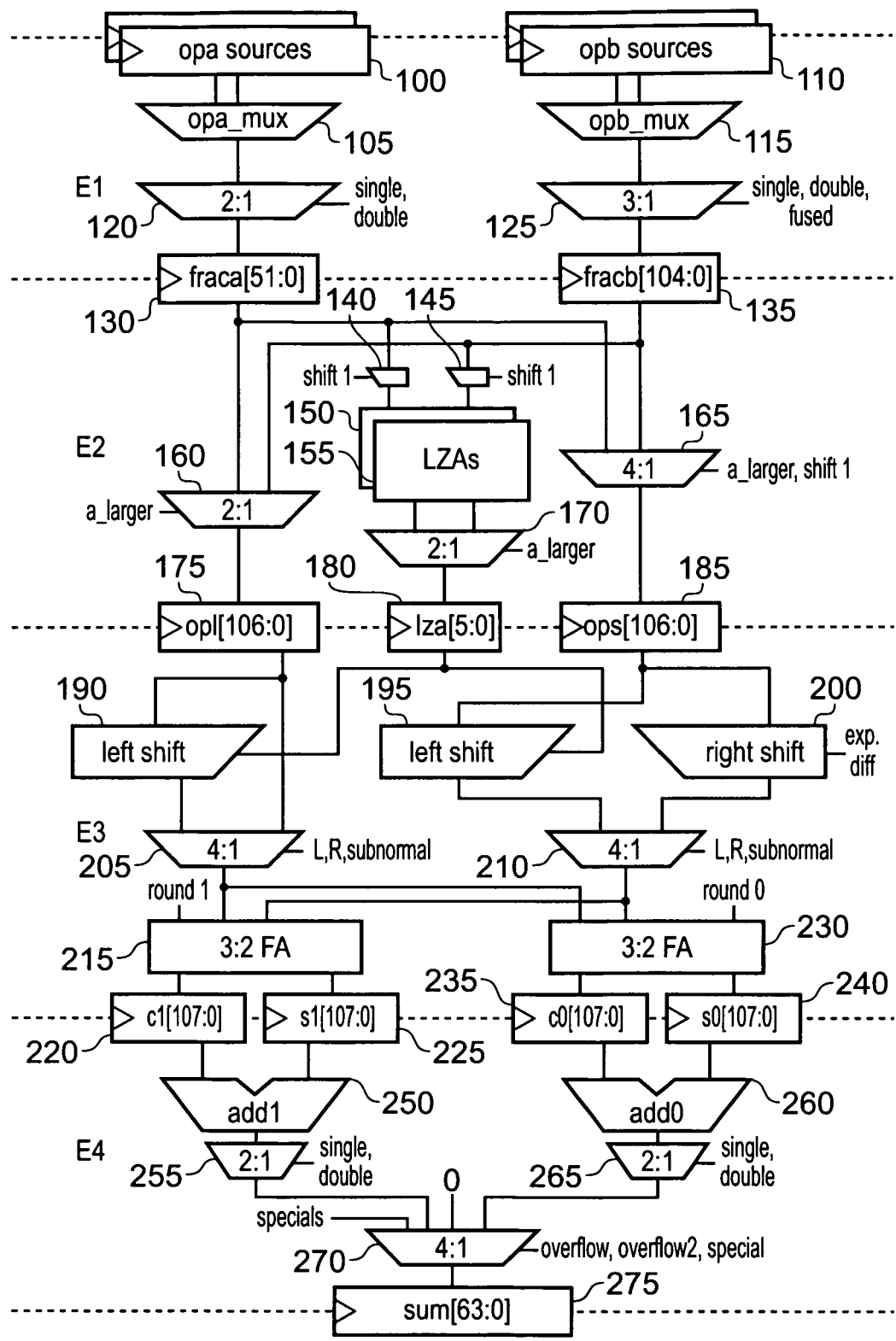
FIG. 2 is a diagram illustrating the components provided within the significand processing path of the adding circuit of FIG. 1 in accordance with one embodiment.

FIG. 2 is a diagram illustrating the components provided within the significand processing path of a novel adding circuit 8 aimed at addressing the above issues.

As shown in execution stage E1, there are several sources for operand A and operand B (referred to hereafter as opa and opb), for example a register file, operand forwarding from the adder 8, operand forwarding from the multiplier 4, and these various sources are shown schematically by the boxes 100, 110 in FIG. 2. In the embodiment described in FIG. 2, it is assumed that if a fused MAC operation is being performed the unrounded multiplication result L*M from the multiplier is provided as an opb source to the adder of FIG. 2. Control circuitry external to the adder unit shown in FIG. 2 identifies which inputs to select by sending appropriate control signals to the multiplexers opa_mux 105 and opb_mux 115.

The next multiplexer circuits 120, 125 then select from the available bits according to the type of the operand (single, double, or fused multiply output). For simplicity, the exponent circuitry is not shown in FIG. 2 since most of the computation involves the significands (exponents are mostly used to control what happens to the significands). The outputs from the multiplexers 120, 125 are stored in the flip-flops 130, 135 at the end of pipeline stage E1.

In pipeline stage E2, the fraction values stored in the flip-flops 130, 135 are both provided to the two multiplexers 160, 165, both multiplexers being controller by an "a_larger" signal determined in the exponent path to identify whether opa is the larger operand. The multiplexer 160 then selects the fraction value associated with the larger operand, and the multiplexer 165 selects the fraction value associated with the smaller operand, both values being extended to 107 bits and stored in the associated flip-flops 175, 185 at the end of pipeline stage E2. In particular, the multiplexers 160, 165 include logic for adding a leading bit to convert the fractions into significands, thus adding a logic 1 value for normal operands and a logic 0 value for subnormal operands, subnormal operands being detected by them having a predefined exponent value (in one implementation this predefined exponent value being an exponent value of all zeros). As well as then padding the significand of opa out to 106 bits to match the significand of opb (by adding a series of logic zero values as the least significant bits), a further additional bit is added to both significands to allow for all information to be captured in the presence of a possible 1-bit right shift which may occur for reasons discussed later (logically the 1-bit right shift being performed after conversion to a significand).

However, the determination as to which operand is larger is only available towards the end of pipeline stage E2. Prior to that information being available, prediction circuitry (in this case leading zero detection circuitry) is used to generate a shift indication based on a prediction of the number of leading zeros that would be present in an output produced by subjecting the operands opa and opb to an unlike signed addition. This shift indication will be used later if a leading bit cancellation condition is determined to be present, such a leading bit cancellation condition occurring if the exponents of opa and opb have the same value or have values differing by 1, and if an unlike signed addition is used to perform the addition operation on opa and opb.

With this in mind, the control signal shift 1 is set if the low order bit of the two input exponents is different (i.e., shift1=expa[0] XOR expb[0]). If Shift1 indicates that the exponent difference is odd, then it can be deduced that if the leading bit cancellation condition is subsequently determined to exist, the exponents will differ by one. Hence, when the shift1 control signal is set, the smaller fraction needs to be right shifted one bit prior to performing the LZA calculation.

Since it is not yet known which operand is larger, two LZA circuits 150, 155 are provided, the first one computing fraca minus (if appropriate, 1-bit shifted) fracb and the second computing fracb minus (if appropriate, 1-bit shifted) fraca. While this is happening, it is being determined which of operand A and operand B is larger, as well as the exact exponent difference between the two operands (this circuitry involves processing of the exponents and so is not shown in FIG. 2, but just involves two subtractions as will be discussed later with reference to FIG. 3C).

The multiplexer 170 at the end of stage E2 then selects the correct LZA value for larger operand minus (if appropriate, 1-bit shifted) smaller operand, and stores that value in the flip-flop 180. As mentioned earlier the multiplexers 160 and 165 select the significands of the larger and smaller operands, respectively. It should also be noted that the multiplexer 165 is a 4:1 multiplexer and also reacts to the shift 1 signal being set to select a 1-bit right shifted version of the significand of the smaller operand.

The leading zero anticipator circuits can be constructed in a variety of ways, as will be understood by those skilled in the art, see for example, the article "Leading Zero Anticipation and Detection—a Comparison of Methods", by M Schmookler et al, 15$^{th}$ IEEE Symposium on Computer Arithmetic, pages 7-12, June 2001, and also commonly owned U.S. Pat. No. 7,668,892, the entire contents of which are hereby incorporated by reference.

By the beginning of pipeline stage E3, it is known whether the operation is a like-signed add (LSA) or unlike-signed add (USA). All LSAs and all USAs with an exponent difference of 2 or more have the significand of ops right shifted by the exponent difference using the right shift circuit 200 (taking into account that for odd differences in the exponent, the significand of ops has already experienced a 1-bit shift via the multiplexer 165). USAs with an exponent difference of 0 or 1 (i.e. those additions giving rise to the earlier-mentioned leading bit cancellation condition) have both opl and ops left shifted by the LZA value stored in the flip-flop 180, using the left shift circuits 190, 195. However, the amount of left shift applied is limited to the difference between the exponent of the larger operand and the exponent associated with a subnormal value (e.g. an exponent value of all zeros).

Since the subnormal exponent value zero and the normal exponent value one both correspond to the same actual exponent, there is a 1-bit right shift correction required if the result exponent is zero. This is handled in the 4:1 multiplexers 205, 210. In particular, the multiplexer 205 selects between the left-shifted significand of opl and the un-shifted significand of opl dependent on the presence of the leading bit cancellation condition, and chooses 1-bit corrected versions if subnormal correction is required. Similarly, the multiplexer 210 selects between the left-shifted significand of ops and the right-shifted significand of ops dependent on the presence of the leading bit cancellation condition, and chooses 1-bit corrected versions if subnormal correction is required.

At the end of stage E3, two 3:2 adders 215, 230 are used to combine the two outputs from the multiplexers 205, 210, with rounding constants injected, adder 230 assuming no overflow occurs, and adder 215 assuming an overflow does occur. A further discussion of the rounding constants will be provided later. Both adders output a result in carry-save format, with the carry and save values being stored within flip-flops 220, 225 and 235, 240, respectively at the end of stage E3. These flip-flops are 108 bits in size in order to capture any carry out bit that may occur from the 3:2 adders.

In stage E4, the carry-save forms are added and then reassembled as single or double-precision numbers using the adders and multiplexers 250, 255 and 260, 265. The significand of the final result is then selected via multiplexer 270, and the fraction part of that significand is then stored along with the sign and exponent of the result within flip-flop 275. The flip-flop 275 is 64 bits in size to accommodate the 1-bit sign value, 52 bit fraction value and the 11 bit exponent value. There are four possibilities as to how the significand of the final result is selected by the multiplexer 270:

Possibility 1—a special result is picked (this overrides the adder outputs). Specials are selected mostly based on exponent logic not shown in FIG. 2, a special result typically being detected if the exponent of the result is all ones. Special results are things like NaNs (not a number) and infinities, and circuitry to handle specials is well understood by knowledgeable practitioners.

Possibility 2—the output of the overflow adder (add 1) 250 is picked if bit 107 of the non-overflow adder (add0) 260 is set. However, in one particular embodiment, there is one exception to this rule, in that this output is not picked for an USA operation with a computed result exponent of zero, since this is a separate subnormal case that cannot overflow; in this exceptional case, the output of adder 260 is chosen.

Possibility 3—the overflow2 result (which sets all fraction bits of the result significand to zero, and then selects an exponent 1 higher than computed for the add1 output) is picked (1) if the carry out of add1 (bit 108) is set or (2) if bit 107 of the output of add0 is set and there is a fused input with a USA operation and a calculated result exponent of zero (this latter case is a subnormal double overflow case).

Possibility 4—absent any of the situations set out in possibilities 1-3 above, the output of add0 is used to form the significand of the result.

Looking at the circuitry of FIG. 2 as described above, it will be seen that it does not have separate near and far paths. In traditional near/far path adders, the LZA computation is done at the same time as the addition, with the LZA value being used to normalize the sum. However, from the above discussion of FIG. 2, it will be seen that the LZA computation occurs much earlier, being performed in stage E2, two cycles before the addition in stage E4. The computed LZA value is then used to pre-normalize the result of the addition, by left shifting the significands of the two operands in stage E3, discarding a number of leading bits of those significands as a result. Since in the presence of an USA operation these leading bits will cancel when added (i.e. will all be zeros), no information is lost via this left shift operation.

Furthermore, by pre-normalizing the sum in this manner, it is then ensured that if the leading bit cancellation condition is determined to be present, and hence the outputs from the two left shift circuits 190, 195 are used for the addition, the shifted significands are now properly aligned for a rounding injection, and so the two adders 250, 260 in stage E4 produce correctly rounded results. In addition, the LZA correction problem described in the article "A Small and Fast Leading One Predictor Corrector Circuit" by C Hinds and D Lutz, Asilomar Conference on Signals, Systems, and Computers, pages 1181-1185, October 2005, is handled automatically by having the two adders 250, 260 in stage E4. In particular, the output of the LZA circuit can be one bit out in its prediction of the number of leading zeros, but in the presence of such an error an overflow will occur from the adder add0 260, causing the output from the adder add1 250 to be selected, thereby automatically correcting the error in the leading zero prediction.

There is no true near or far path in the adder of FIG. 2. Operations that would have used the far path ignore the LZA result and right shift the smaller operand by an amount computed from the exponent difference of the two operands. Operations that would have used the near path use the LZA result to left shift the operands in stage E3. In both cases rounding constants are added with 3:2 adders at the end of stage E3.

Due to a peculiarity of fused inputs, the final sum can actually achieve the result 4.0 (denoted overflow 2 in the control to the multiplexer 270). This is due to the fact that the multiplication result is not rounded, and so may have an incorrect exponent. As an example, consider a situation where the multiplication result from the multiplier 4 consists of more than 54 leading ones. If rounded, it would have a higher exponent, but it has not been rounded. If a number near to this one is then subtracted from it via an USA operation within the adder 8, the exponent can have any of three values, namely equal to the exponent of the result associated with the output of the add0 adder, one more than the exponent of the result associated with the output of the add0 adder, or two more than the exponent of the result associated with the output of the add0 adder. As will be discussed later with reference to FIG. 4, the way the adder 8 handles USAs is to set the exponent of the output from the add0 adder to be 1 less than the exponent of the larger operand (assuming the output of right shift circuit 200 is used) or to set the exponent of the output from the add0 adder to be equal to the exponent of the larger operand minus the LZA value (assuming the output of left shift circuits 190, 195 are used), and then allow the sum to overflow to the next largest exponent. With an unrounded (fused) input, it is actually possible to overflow to the next higher exponent again, hence the need for the handling of the overflow 2 condition as described earlier (possibility 3).

With regards to handling of subnormals, this merely requires inserting the appropriate significand bit in op1 and ops within stage E2 (for subnormal numbers this will be a 0 whereas for normal numbers it will be a 1), and then adjusting the shift amount by one using the 4:1 multiplexers 205, 210 in stage E3. Subnormals thereafter are handled using the normal flow described with reference to FIG. 2, other than needing to cover the overflow 2 condition in the final addition (the result of an USA operation in such cases can be subnormal, normal with a minimum exponent, or normal with an exponent that is minimum plus 1).

Figure 3A:
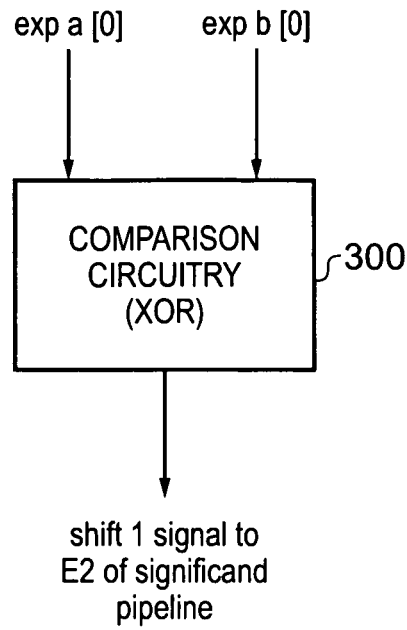
FIGS. 3A to 3C schematically illustrate circuits that can be used to produce various control signals input to the components of FIG. 2 in accordance with one embodiment.
Figure 3B:
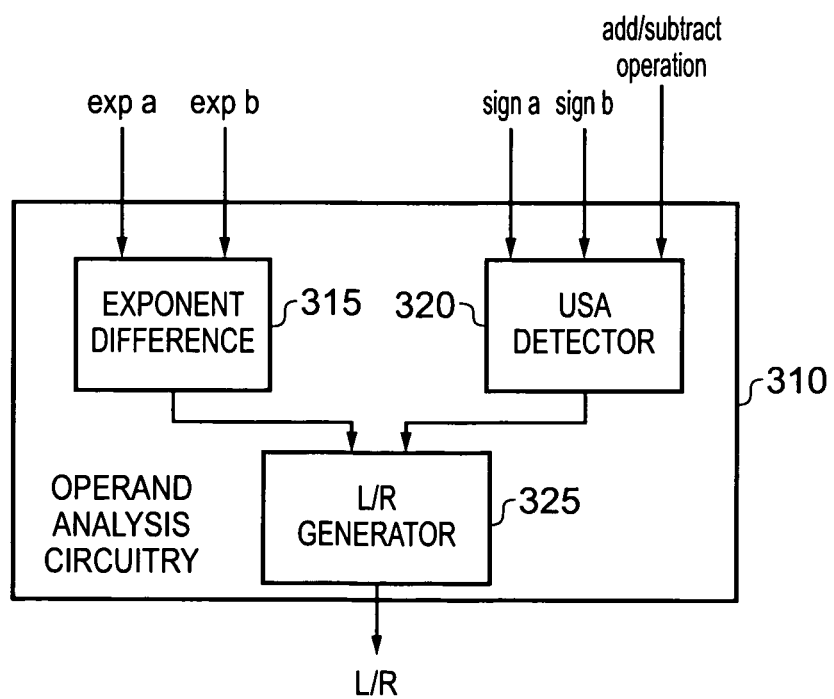
Figure 3C:
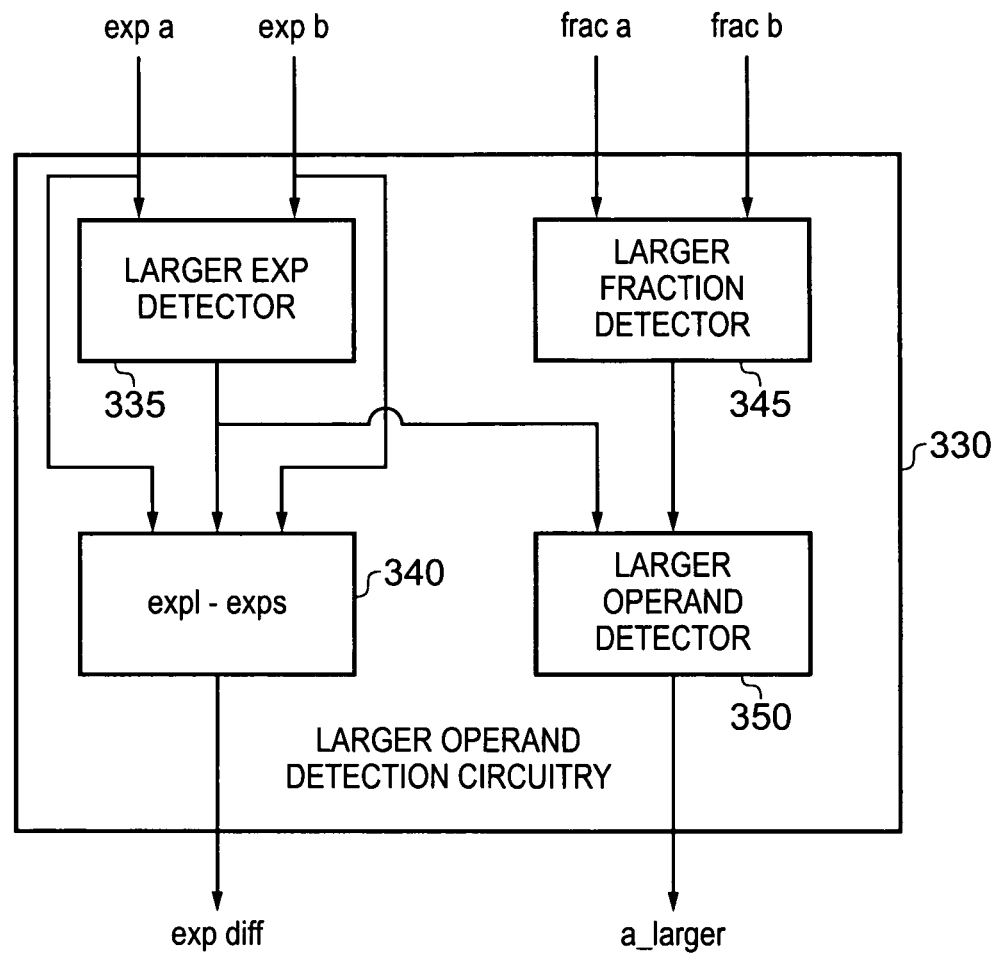

FIGS. 3A to 3C illustrate circuits that can be provided in order to generate various of the control signals input to the components of FIG. 2 in accordance with one embodiment. As shown in FIG. 3A, comparison circuitry 300, which preferably takes the form of an XOR gate, receives the least significant bit of both the exponent of operand A and the exponent of operand B, and produces at its output the "shift1" signal that is input to the pipeline stage E2 of FIG. 2. Accordingly, it will be appreciated that the shift1 signal is set to a logic one value if these least significant bits of the exponents differ, and otherwise is cleared to a logic zero value.

FIG. 3B illustrates the operation of operand analysis circuitry 310 which is used to generate the L (left shift) or R (right shift) control signals input to the multiplexers 205, 210 during pipeline stage E3. In particular, an exponent difference circuit 315 receives the exponents of operands A and B and determines the difference between those exponents. Also a USA detector 320 determines, from the signs of both input operands and the add or subtract operation specified by the input instruction, whether a USA operation is to be performed. The L/R generator 325 then receives the output from both the exponent difference circuit 315 and the USA detector 320. If the exponents of the operands A and B have the same value or have values differing by 1, and an unlike signed addition is to be performed, then this indicates the presence of the leading bit cancellation condition, and accordingly the L output is set. Conversely, if the leading bit cancellation condition is not present, the R output is set. In practice a single bit output signal could be used, where one value indicates L and the other value indicates R.

FIG. 3C schematically illustrates the operation of larger operand detection circuitry 330 used to produce the "exp diff" signal and the "a_larger" signal used in pipeline stages E2 and E3 of FIG. 2. The larger exponent detector 335 determines from the exponents of operands A and B which is the larger exponent, and then the circuit 340 subtracts the smaller exponent from the larger exponent in order to produce the exp diff signal. The larger fraction detector 345 then receives the fraction values of both operands A and B and works out which fraction is larger. The larger operand detector 350 receives the output from the larger exponent detector 335 and the larger fraction detector 345, and based on this input determines which operand is larger. Typically the output from the larger exponent detector 335 is used to determine which is the larger operand, but if the exponents are equal, the output from the larger fraction detector is used to determine the larger operand. The larger operand detector 350 then generates the a_larger signal which is set to a logic one value if operand A is larger and is cleared to a logic zero value if operand B is larger.

Figure 4:
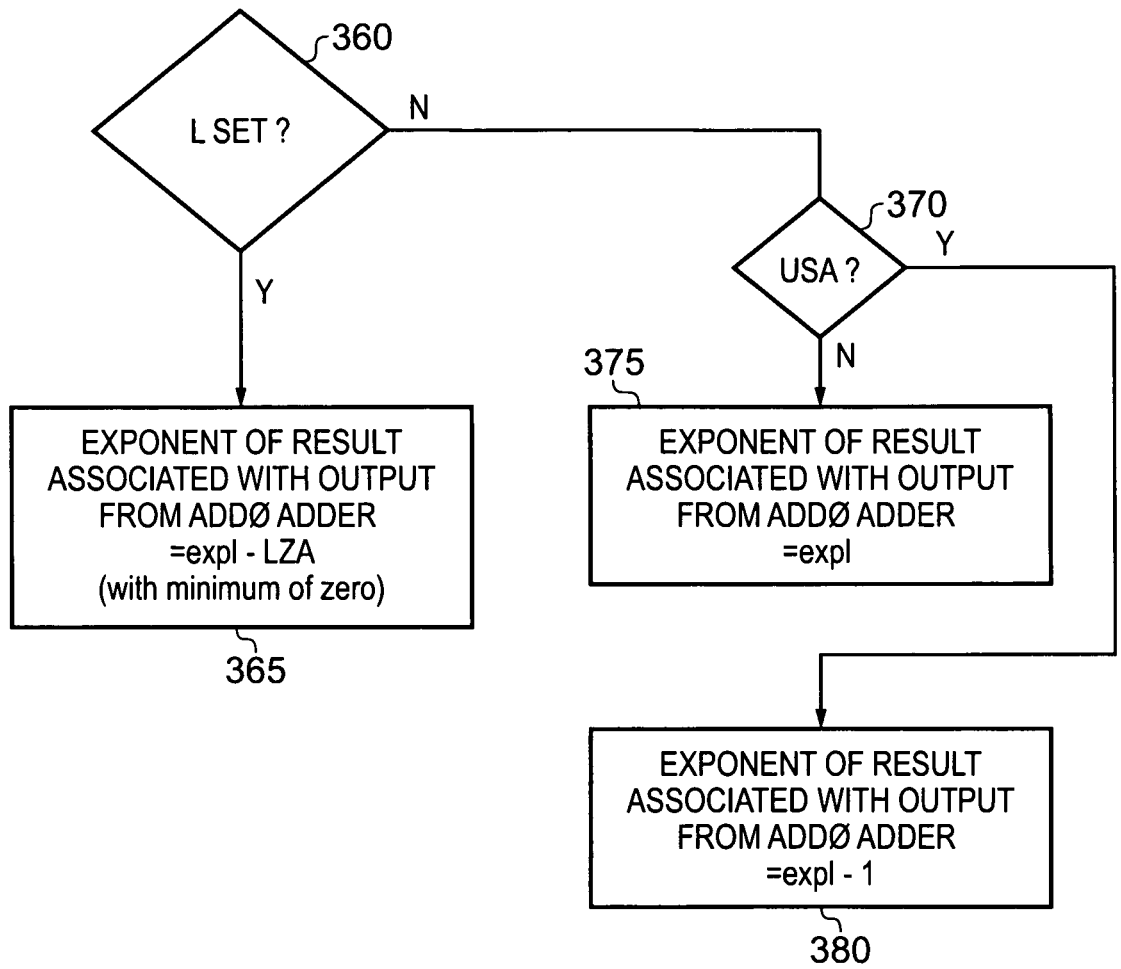
FIG. 4 is a flow diagram illustrating how the exponent of the result associated with the output from the adder add0 of FIG. 2 is computed in accordance with one embodiment.

FIG. 4 is a flow diagram illustrating steps performed in an exponent processing path (not shown in FIG. 2) in order to determine an exponent to be associated with the result output from the adder add 0 260 of FIG. 2. At step 360, it is determined whether the L value has been set at the output of the operand analysis circuitry 310. If it has, then at step 365 the exponent of the result associated with the output from the adder 260 is set equal to the exponent of the larger operand minus the LZA value stored in the flip-flop 180. However, there is a limit on how much the larger exponent is decremented by, in that in one embodiment it is not allowed to be decremented below a value which would be associated with a subnormal value, which in one particular embodiment is an exponent value of all zeros.

If at step 360 it is determined that the L value is not set, then the process proceeds to step 370, where it is determined whether an unlike signed add operation is to be performed. If not, then the process proceeds to step 375, where the exponent of the result associated with the output from the adder 260 is set equal to the exponent of the larger operand. However, if it is determined at step 370 that an unlike signed add operation is to be performed, then the process proceeds to step 380, where the exponent of the result associated with the output from adder 260 is set equal to the exponent of the larger operand minus 1.

Having determined the exponent of the result associated with the output from the adder 260, it will be appreciated that the exponent of the result associated with the output from the adder 250 is merely set to one larger than that calculated exponent.

If the exponent of the result to be associated with the output from adder 260 is all zeros, then this indicates the presence of the subnormal condition, and causes the subnormal signal to be set and supplied as an input to the multiplexers 205, 210 in stage E3 of the pipeline of FIG. 2. Similarly, if the exponent of the result to be associated with the output from adder 260 is all ones, this indicates the presence of a special case, and is used to set the special signal input to the multiplexer 270 during stage E4 of the pipeline of FIG. 2.

Figure 5A:
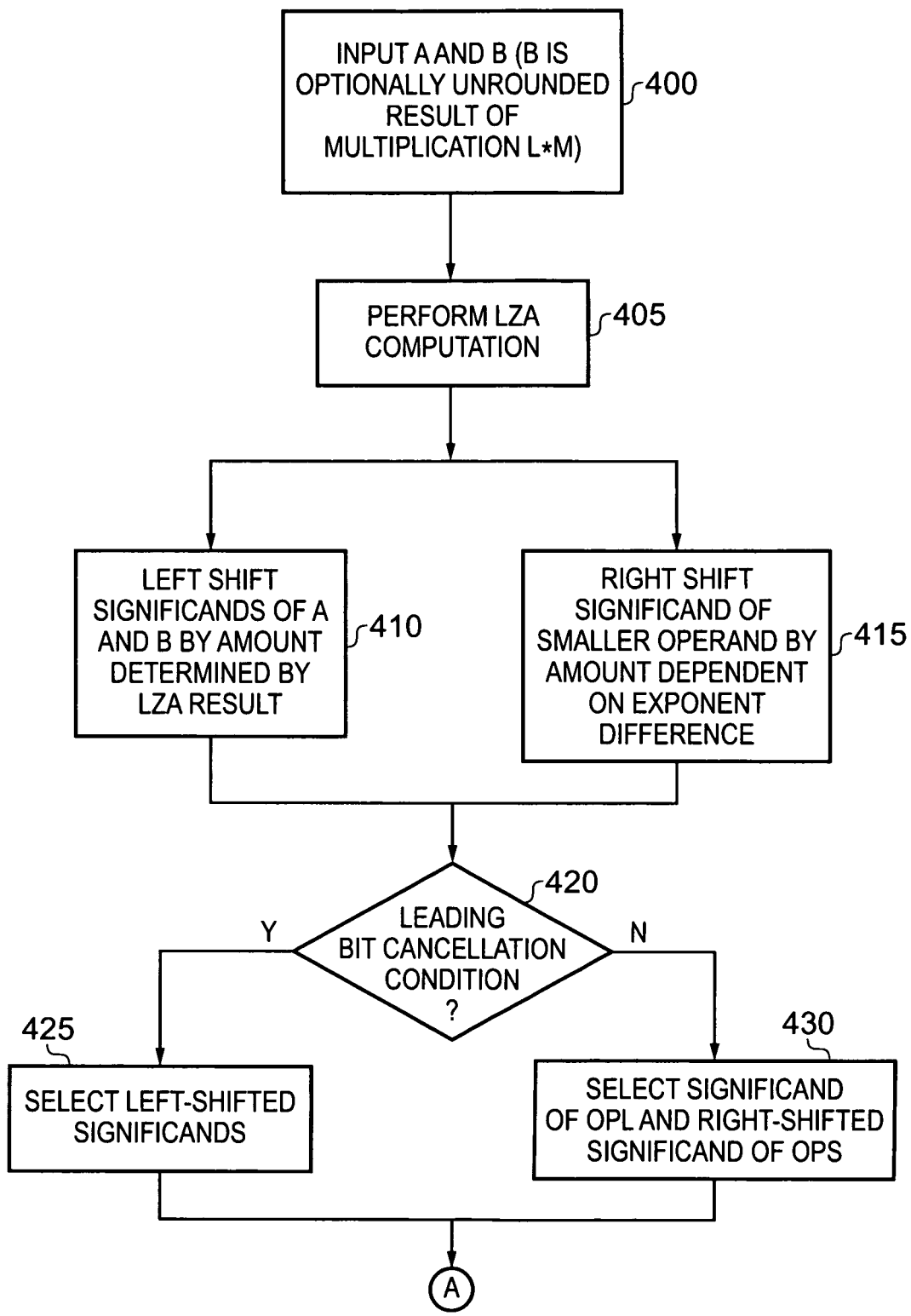
FIGS. 5A and 5B are flow diagrams illustrating the operation of the circuitry of FIG. 2 in accordance with one embodiment.
Figure 5B:
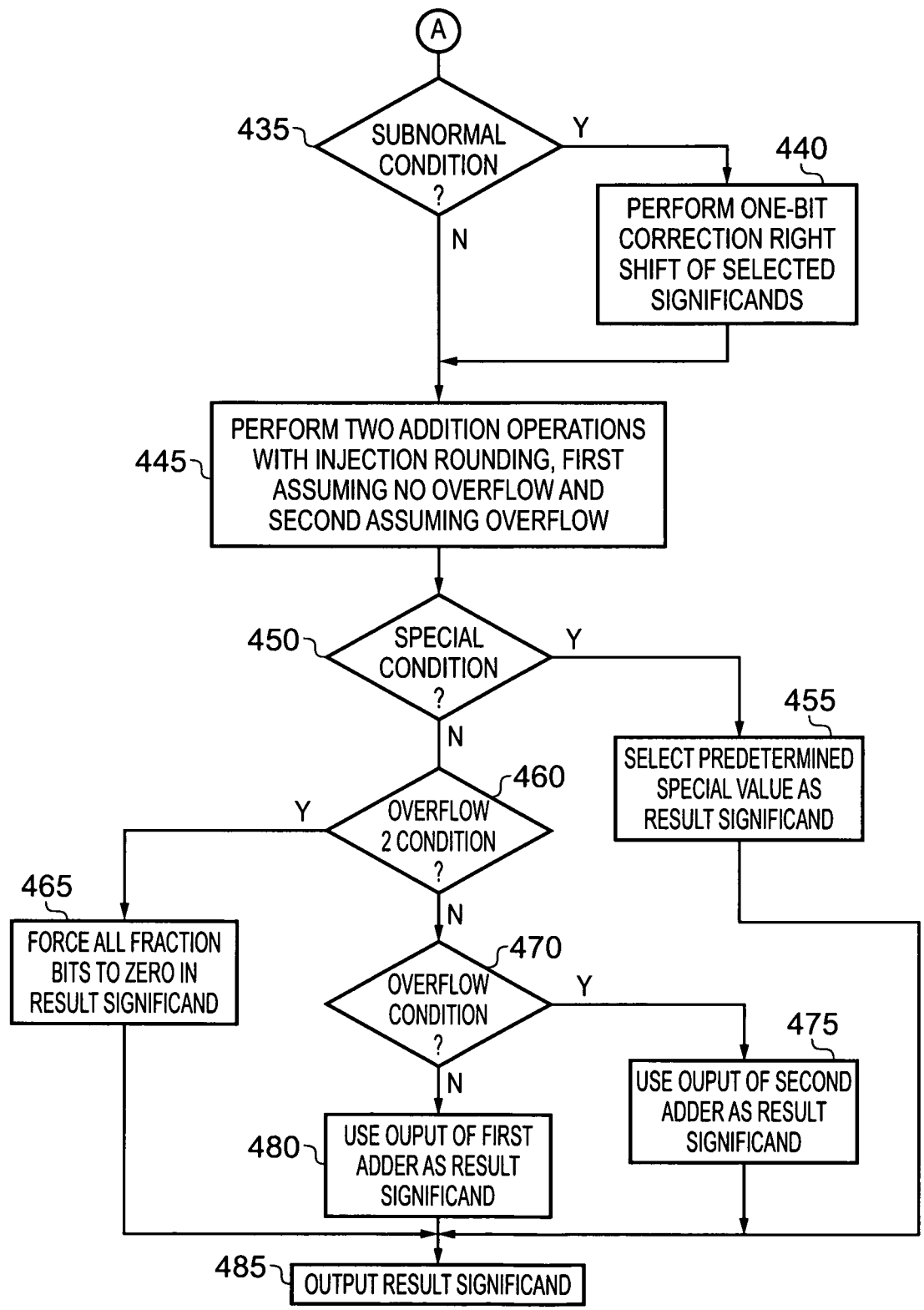

FIGS. 5A and 5B provide a flow diagram illustrating the operation of the circuitry of FIG. 2 in accordance with one embodiment. At step 400, the input operands A and B are received, the operand B in some embodiments being the unrounded result of the multiplication of operands L and M. Thereafter, a leading zero anticipation (LZA) computation is performed at step 405, this process being discussed in more detail later with reference to FIG. 6.

Thereafter, steps 410 and 415 are performed in parallel, at step 410 the significands of operands A and B being left shifted by an amount determined by the LZA result produced at step 405. At step 415, the significand of the smaller operand is right shifted by an amount dependent on the exponent difference.

Thereafter, the process proceeds to step 420, where it is determined whether the leading bit cancellation condition is present. If so, then the left-shifted significands as produced by step 410 are selected at step 425. Conversely, if the leading bit cancellation condition is not present, then the significand of the larger operand and the right-shifted significand of the smaller operand are selected at step 430.

Following either step 425 or step 430, the process proceeds to step 435, where it is determined whether a subnormal condition exists, typically this being detected if the exponent of the result associated with adder 260 is all zeros. If the subnormal condition is determined to exist, the process proceeds to step 440, where a 1-bit correction right shift of the selected significands is performed.

Following step 440, or directly following step 435 if no subnormal condition exists, two addition operations are performed with injection rounding at step 445, the first addition assuming no overflow and the second addition assuming an overflow condition.

Thereafter, at step 450, it is determined whether there is a special condition detected, as mentioned earlier this typically being the case if the exponent associated with the result from the adder 260 is all ones. If the special condition is present, then the process proceeds to step 455 where a predetermined special value is selected as the result significand. However, assuming the special condition is not present, then it is detected at step 460 whether the overflow 2 condition is present. If it is, then the process branches to step 465, where all fraction bits of the result significand are forced to zero.

Assuming the overflow 2 condition does not exist, then at step 470 it is determined whether the overflow condition exists, i.e. whether there is a carry out from the adder 260. If there is, then the output of the second adder 250 is used as the result significand at step 475, whereas in the absence of the overflow condition the output of the first adder 260 is used as the result significand. Following the relevant one of steps 455, 465, 475 and 480, the result significand is then output at step 485.

Figure 6:
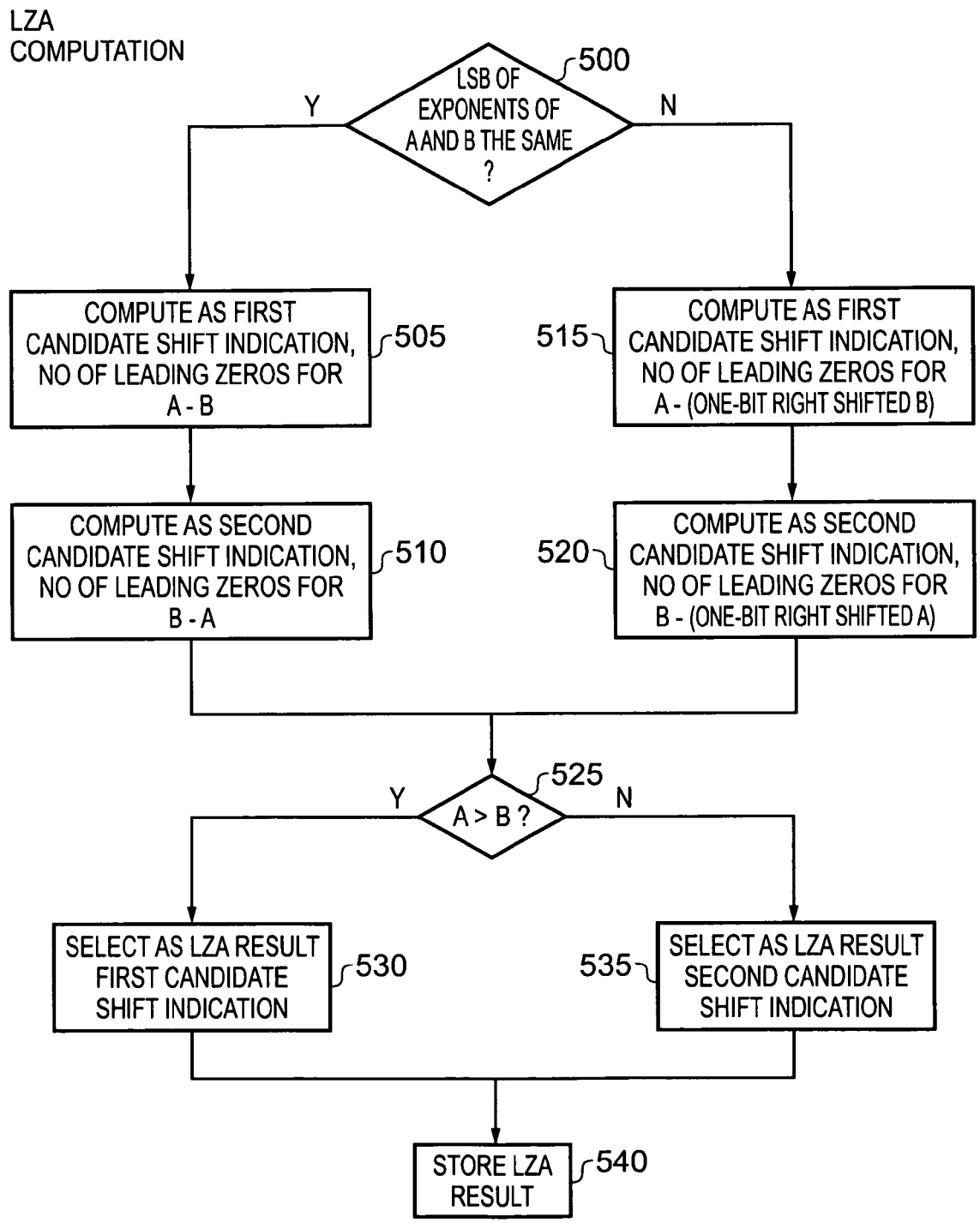
FIG. 6 is a flow diagram illustrating the steps required to perform the LZA computation of FIG. 5A in accordance with one embodiment.

FIG. 6 is a flow diagram illustrating in more detail step 405 of FIG. 5A. At step 500, it is determined whether the least significant bit of the exponents of operands A and B are the same. If they are, then the process proceeds to step 505 and step 510, where first and second candidate shift indications are produced, the first candidate shift indication assuming that operand A is larger and the second candidate shift indication assuming operand B is larger.

Similarly, if the least significant bit of the exponents of operands A and B are not the same, the process proceeds to steps 515 and 520, where first and second candidate shift indications are again produced assuming operand A is larger or operand B is larger, respectively. However, in the computations at steps 515 and 520, a 1-bit right shifted version of the assumed smaller operand is used.

The process then proceeds to step 525 where it is determined whether operand A is larger than operand B. If so, then the process proceeds to step 530 where the first candidate shift indication is selected as the LZA result to be stored in the flip-flop 180. However, if it is determined at step 525 that operand A is not larger than operand B, then the second candidate shift indication is selected as the LZA result at step 535. Following either step 530 or 535, the LZA result is then stored in the flip-flop 180 at step 540.

Considering now for completeness the rounding values input as round0 and round 1 to the 3:2 adders 215, 230 in FIG. 2, these values will depend on the rounding mode being used. For example there are four IEEE 754 rounding modes: RZ (round toward zero), RN (round to nearest even), RM (round toward minus infinity), and RP (round toward plus infinity). Due to floating-point numbers being stored as sign and magnitude, RM and RP can be thought of as round toward infinity (RU) for part of their ranges, and RZ for the rest of the range. Specifically, for RP mode any positive number is rounded up toward infinity (RU rounding), and any negative number is not rounded (RZ rounding), whilst for RM mode any negative number is rounded up toward infinity (RU rounding), and any positive number is not rounded (RZ rounding). Hence, for all practical purposes, there are only three rounding modes: RZ, RN, RU.

Rounding by injection means adding a constant that performs one of the three rounding modes. The benefit of injection rounding is that the required injection can occur before the addition is performed, avoiding the need for a separate rounding operation after the output of the addition. Considering first a single precision floating point number which has 24 bits in its significand, for RN mode a 1 is injected just to the right of the 24th bit. For RU mode a word of all ones is injected to the right of the 24th bit. For RZ mode no injection takes place (i.e. an injection value of zero is selected).

There are actually two rounding constants used in the embodiment of FIG. 2, because there is some uncertainty as to where the top 24 bits are. If there is a carry out when we are summing the two numbers, then the top 24 bits are one bit left from where they are when there is no carry out. This is why there are two adders and two rounding constants provided in stage E4—one adder assumes that there is a carry out from the sum, and the other assumes that there is not. It can be determined which adder is correct by looking at the carry out bit of the lower adder 260.

Hence the injection rounding value round0 for the lower adder (add0) when adding single precision numbers is:
upper 24 bits: zeros
25th bit: one if using RU or RN mode
26th and remaining bits: ones if using RU mode The injection rounding value round 1 for the upper adder (add1) when adding single precision numbers is:
upper 23 bits: zeros
24th bit: one if using RU or RN mode
25th and remaining bits: ones if using RU mode A double precision number has 53 bits in its significand, so the injection happens to the right of the 53d bit. Otherwise the logic is exactly the same as it is for the single-precision adder. Hence, the injection rounding value round0 for the lower adder (add0) when adding double precision numbers is:
upper 53 bits: zeros
54th bit: one if using RU or RN mode
55th and remaining bits: ones if using RU mode The injection rounding value round 1 for the upper adder (add1) when adding double precision numbers is:
upper 52 bits: zeros
53d bit: one if using RU or RN mode
54th and remaining bits: ones if using RU mode In accordance with the adder as described in FIG. 2, the inputs to the adders are arranged (via pre-normalization of the result in the presence of the leading bit cancellation condition) so that the same two injection constants can always be used.

The following text provides some examples, illustrating how the unified path of the adder circuitry of FIG. 2 is able to deal with additions that would traditionally have been passed through a far path of an adder, and also additions that would traditionally have been passed through a near path of an adder.

Floating-point numbers are represented as a sign bit and a magnitude, and the magnitude is always positive. The sign bits and the operation (addition or subtraction) are evaluated in order to determine whether the operation is a like-signed add (LSA) or an unlike-signed add (USA).

An LSA is:
positive A plus positive B
negative A plus negative B
positive A minus negative B
negative A minus positive B A USA is:
positive A plus negative B
negative A plus positive B
positive A minus positive B
negative A minus negative B For the following examples, for clarity a short format with only 4 bits of significand and a small exponent is used. Real examples would have 24 or 53 bit significands. For simplicity, the rounding constants are not included. In the following examples, a number expressed as 1.011e4 represents the number 1.011 times two to the fourth power.

Example 1

LSA, classic far path (LSA is always a right shift case)
1.011e4
+1.101e2

Before we can add, we need to make the exponents the same, so the smaller number has to be right shifted two places.

$$\begin{array}{r} 1.011 \quad e4 \\ +0.01101 \quad e4 \\ \hline 1.11001 \quad e4 \end{array}$$

Referring to FIG. 2, in the above example, the LZA output 180 would be ignored, the smaller operand would be right shifted using the right shift circuit 200, and the output from the add0 adder 260 would be selected as there is no overflow.

Example 2

USA right shift, classic far path
1.011e4
1.001e2

Before we can subtract, we need to make the exponents the same, so the smaller number has to be right shifted two places by the right shift circuit 200.

$$\begin{array}{r} 1.011 \quad e4 \\ -0.01001 \quad e4 \\ \hline 1.00011 \quad e4 \end{array}$$

The way subtractions are done in two's complement arithmetic is to invert the subtrahend and add it and one to the minuend (minuend−subtrahend=difference). We also left shift subtractions by one bit position and decrement the exponent so that the exponents work out (it's a subtraction, so the exponent might be one less than what we started with, but it's not going to get bigger). We let add0 handle the case where the exponent gets smaller, and add1 handle the case where the difference "overflows" to the original exponent). Referring to FIG. 2, the above can in one embodiment be achieved by adding logic to the inverter 165 in stage E2 to invert the subtrahend, adding logic to both multiplexers 205, 210 in stage E3 to left shift both significands, and then adding the 1 value as another input to both adders 250, 260 in stage E4. As a result it can be seen that the addition performed is:

```
    0.1100 e3
   +1.0110 e3
   +      1
   ─────────
   10.0011 e3
```

The carry out means that the correct answer is from the overflow adder 250, which has an exponent that is one higher: 1.000 e4 (RZ rounding)

Note that in this case if we were rounding in RU or RN mode the answer would be 1.001e4.

Example 3

USA with identical exponents, left shift required, classic near path
1.110 e4
−1.100 e4
Converting to two's complement addition, this becomes:

```
    1.110 e4
   +0.011 e4
   +     1
   ─────────
    0.010 e4
```

The result is not a normal number (normal floating point numbers must be of the form 1.xxx times some exponent). So what we do is use the LZA output 180 to tell us how much to left shift both operands, and then use the left shift circuits 190, 195 to perform the required left shift. In this case the predicted LZA is 3, so the addition becomes:

```
    0.000 e1
   +1.111 e1   (we fill in ones as we left shift the subtrahend)
   +     1
   ─────────
   10.000 e1
```

The carry out means that the correct answer is from the overflow adder 250, which has an exponent that is one higher, i.e.:
1.000 e2

Example 4

USA with off-by-one exponents, left shift required, classic near path
1.011e4
−1.100 e3
This requires a 1-bit right shift (performed by the multiplexer 165) to make the exponents the same:
1.011e4
−0.1100 e4
Converting to two's complement addition, this becomes:

```
    1.011  e4
   +1.0011 e4
   +     1
```

The predicted LZA is 2, so we left shift both operands by 2 using left shift circuits 190, 195, adjusting the exponent accordingly, to give:

```
    1.100  e2
   +0.111  e2
   +     1
   ──────────
   10.100  e2
```

The carry out means that the correct answer is from the overflow adder 250, which has an exponent that is one higher:
1.010 e3

Example 5

USA with double overflow, classic far path
For this example, we need one of the inputs to come from the multiplier 4 as part of a fused multiply add. This input will be twice as long as the other input, and since it is not rounded, it may have an exponent that is off by one as compared to the same result rounded. For example, suppose that the multiplier output is
1.111_1110 e7
(the underscore is just here to make the long string of bits more readable—it doesn't mean anything)
If we were to round this by RU or RN rounding, we would get
1.000 e8
This leads to an interesting situation in which we can subtract a small number from the product and have the exponent go up. This is referred to herein as "double overflow". For example:
1.111_1110 e7
−1.000 e2
After right shifting the smaller operand we have
1.111_1110 e7
−0.000_0100 e7
Converting to two's complement addition, plus doing a 1-bit left shift because of the subtraction (see example 2), this becomes:

```
    1.11_1110 e6
   +1.11_1011 e6
   +        1
   ─────────────
   11.11_1010 e6
```

The carry out means that the correct answer is from the overflow adder 250, so the exponent should be one higher. Note however, that if we had added a rounding constant (either RN or RU), then the sum would double overflow:

```
    1.111_1010 e7
   +       1000   (RN rounding constant)
   ──────────────
   10.000_0010
``` giving a correctly rounded answer of
1.000 e8
Considering FIG. 2, the way in which this situation is detected is to detect an overflow from the upper adder add1 250, and in the event of such an overflow to force all of the fraction bits of the significand of the result to 1, and to select as the exponent of the result an exponent one higher than that associated with the output of the upper adder 250.

It will be appreciated from the above description that embodiments of the present invention provide a novel adder circuit that includes an early LZA determination (in one embodiment done before the fractions, or indeed the other bits of the exponents, are compared) followed by pre-normalization of the result by left-shifting of both operands before the sum is computed. Further, injection rounding is used for all additions, and in particular is able to be used for effective subtractions with cancellation of leading bits, due to the pre-normalization of the result. This provides a particularly simple and efficient adder circuit, avoiding the need for separate near and far paths as adopted in traditional prior art approaches. It should also be noted that in accordance with embodiments there is no need for a leading zero correction, because if the leading zero value is off by one, it will be corrected automatically by the use of the output from the overflow adder 250 of FIG. 2.

The adder circuit of embodiments is particularly beneficial when the adder circuit is coupled with a separate multiplier circuit in order to support fused multiply add operations, where the output of the multiplier is provided unrounded to the adder circuit. In particular, the adder circuit of embodiments allows injection rounding to be applied when performing fused multiply add operations, due to the operation of the pre-normalization circuitry ensuring that in the presence of leading bit cancellation, the inputs are still correctly aligned for the injection rounding.

However, whilst the adder is particularly well suited to accommodate fused multiply add operations, the basic design is still an improvement over traditional near/far path adders, even if the design does not support fused multiply add operations. If fused multiply add operations are not to be supported, it will be appreciated that the size of some of the paths of FIG. 2 can be reduced since both significands will be 53 bits in size, assuming double precision values are being handled.

In accordance with the novel adder design described above, the entire near path of a traditional adder is replaced by two left-shifters and two LZA circuits. The timing is equivalent to a near/far path adder (and indeed is significantly better if doing fused multiply add operations), but in addition the adder is considerably simpler and smaller than traditional near/far path adders.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. Apparatus for performing an addition operation on operands A and B in order to produce a result R, the operands A and B and the result R being floating point values each having a significand and an exponent, said apparatus comprising:

prediction circuitry configured to generate a shift indication based on a prediction of the number of leading zeros that would be present in an output produced by subjecting the operands A and B to an unlike signed addition;

result pre-normalization circuitry configured to perform a shift operation on the significands of both operand A and operand B prior to addition of the significands, the shift operation serving to discard a number of most significant bits of the significands of both operand A and operand B as determined by the shift indication in order to produce modified significands for operands A and B;

operand analysis circuitry configured to detect, with reference to the exponents of operands A and B, the presence of a leading bit cancellation condition; and addition circuitry configured, in the presence of said leading bit cancellation condition, to perform an addition of the modified significands for operands A and B, in order to produce the significand of the result R;

the addition circuitry being configured, in the absence of said leading bit cancellation condition, to perform an addition of the significands for operands A and B without using the modified significands produced by the result pre-normalization circuitry, in order to produce the significand of the result R;

wherein:

said operand B is the result of a multiply operation performed on two floating point operands, and is supplied unrounded as an input to the apparatus such that the result R represents the result of a fused multiply-accumulate operation;

the significand of the result R has N bits and the significand of the operand B has greater than N bits due to being supplied unrounded;

the addition circuitry is configured to perform injection rounding to add a rounding increment value during the addition;

the operation of the result pre-normalization circuitry prior to the addition circuitry ensures that the modified significands of operands A and B are correctly aligned for the injection rounding; and the addition circuitry comprises first addition circuitry configured to perform the addition using a first rounding increment value assuming no overflow condition is present and second addition circuitry configured to perform the addition using a second rounding increment value assuming an overflow condition is present.

2. Apparatus as claimed in claim 1, wherein the operand analysis circuitry detects the presence of the leading bit cancellation condition if the exponents of the operands A and B have the same value or have values differing by 1, and if an unlike signed addition is used to perform the addition operation on said operands A and B.

3. Apparatus as claimed in claim 1, wherein the prediction circuitry computes the shift indication for a case where the unlike signed addition causes the smaller of operands A and B to be subtracted from the larger of operands A and B.

4. Apparatus as claimed in claim 3, wherein:

a determination as to which of operands A and B is larger is not available at the time the prediction circuitry begins to compute the leading zero value; and the prediction circuitry is arranged to produce first and second candidate shift indications, the first candidate shift indication assuming operand A is larger than operand B and the second candidate shift indication assuming operand B is larger than operand A.

5. Apparatus as claimed in claim 4, further comprising:

larger operand detection circuitry for determining which of operand A and operand B is the larger operand; and selection circuitry responsive to the larger operand detection circuitry and configured to select as the shift indication the first candidate shift indication if operand A is the larger operand, and to select as the shift indication the second candidate shift indication if operand B is the larger operand.

6. Apparatus as claimed in claim 3, further comprising:
comparison circuitry configured to output a comparison result indicative of whether the least significant bit of the exponent of operand A is the same as the least significant bit of the exponent of operand B;
if the comparison result indicates that the least significant bit of the exponents are the same, the prediction circuitry computes the shift indication for a case where the unlike signed addition causes the smaller of operands A and B to be subtracted from the larger of operands A and B; and
if the comparison result indicates that the least significant bit of the exponents are not the same, the prediction circuitry computes the shift indication for a case where the unlike signed addition causes a one-bit right-shifted version of the smaller of operands A and B to be subtracted from the larger of operands A and B.

7. Apparatus as claimed in claim 1, wherein
in the presence of a leading zero correction condition, the addition circuitry is configured to output as the significand of the result R the result produced by the second addition circuitry from the modified significands of operands A and B.

8. Apparatus as claimed in claim 7, wherein, when said addition circuitry performs the addition of the modified significands for operands A and B, the leading zero correction condition is detected if a carry out is produced from the first addition circuitry.

9. Apparatus as claimed in claim 1, wherein:
said result pre-normalization circuitry performs said shift operation by performing a left shift operation on the significands of both operand A and operand B in order to produce the modified significands for operands A and B.

10. Apparatus as claimed in claim 1, further comprising:
alignment circuitry configured to perform an alignment operation to align the significand of the smaller of operands A and B with the significand of the larger of operands A and B prior to addition of the significands; and
the addition circuitry is configured, if said leading bit cancellation condition is not present, to perform an addition of the significands of operands A and B as aligned by the alignment circuitry.

11. Apparatus as claimed in claim 10, wherein said alignment circuitry performs said alignment operation by performing a right shift operation on the significand of the smaller of operands A and B, with the number of bits of the shift being dependent on the difference between the exponents of operands A and B.

12. Apparatus as claimed in claim 1, wherein the apparatus is configured as a series of pipeline stages, and said result pre-normalization circuitry is located in a pipeline stage prior to a subsequent pipeline stage in which the addition circuitry is located.

13. Apparatus as claimed in claim 12, wherein said prediction circuitry is located in a preceding pipeline stage prior to said pipeline stage in which the result pre-normalization circuitry is located.

14. Apparatus as claimed in claim 1, further comprising:
shift correction circuitry, responsive to detection of a subnormal condition, to perform a one-bit correction right shift of the modified significands for operands A and B prior to input of the addition circuitry.

15. Apparatus as claimed in claim 14, wherein said subnormal condition is detected if the exponent of the result R takes a predefined value.

16. Apparatus as claimed in claim 1, further comprising:
result significand output circuitry, responsive to detection of a double overflow condition, to output all fraction bits of the significand of the result R as logic zero values irrespective of the output of the addition circuitry.

17. Apparatus as claimed in claim 16, wherein the addition circuitry comprises:
first addition circuitry configured to perform the addition using a first rounding increment value assuming no overflow condition is present; and
second addition circuitry configured to perform the addition using a second rounding increment value assuming an overflow condition is present;
the double overflow condition is detected if a carry out occurs from the second addition circuitry when performing an unlike signed addition operation; and
in the presence of the double overflow condition, the exponent of the result is set two greater than the exponent associated with the output from the first addition circuitry.

18. Apparatus as claimed in claim 1, wherein said prediction circuitry comprises leading zero anticipation circuitry configured to compute, as the shift indication, a leading zero value indicative of the number of leading zeros that would be present in an output produced by subjecting the operands A and B to an unlike signed addition.

19. A method of performing within a data processing apparatus an addition operation on operands A and B in order to produce a result R, the operands A and B and the result R being floating point values each having a significand and an exponent, said method comprising:
generating a shift indication based on a prediction of the number of leading zeros that would be present in an output produced by subjecting the operands A and B to an unlike signed addition;
employing result pre-normalization circuitry to perform a shift operation on the significands of both operand A and operand B prior to addition of the significands, the shift operation serving to discard a number of most significant bits of the significands of both operand A and operand B as determined by the shift indication in order to produce modified significands for operands A and B;
detecting, with reference to the exponents of operands A and B, the presence of a leading bit cancellation condition; and
arranging addition circuitry to be responsive to the presence of said leading bit cancellation condition to perform an addition of the modified significands for operands A and B, in order to produce the significand of the result R;
arranging the addition circuitry, in the absence of said leading bit cancellation condition, to perform an addition of the significands for operands A and B without using the modified significands produced by the result pre-normalization circuitry in order to produce the significand of the result R;
wherein:
said operand B is the result of a multiply operation performed on two floating point operands, and is supplied unrounded as an input to the data processing apparatus such that the result R represents the result of a fused multiply-accumulate operation;
the significand of the result R has N bits and the significand of the operand B has greater than N bits due to being supplied unrounded;
the addition circuitry performs injection rounding to add a rounding increment value during the addition;

the operation of the result pre-normalization circuitry prior to the addition circuitry ensures that the modified significands of operands A and B are correctly aligned for the injection rounding; and the addition circuitry performs the addition with first addition circuitry using a first rounding increment value assuming no overflow condition is present and performs the addition with second addition circuitry using a second rounding increment value assuming an overflow condition is present.

20. Apparatus for performing an addition operation on operands A and B in order to produce a result R, the operands A and B and the result R being floating point values each having a significand and an exponent, said apparatus comprising:

means for generating a shift indication based on a prediction of the number of leading zeros that would be present in an output produced by subjecting the operands A and B to an unlike signed addition;

means for performing a shift operation on the significands of both operand A and operand B prior to addition of the significands, the shift operation serving to discard a number of most significant bits of the significands of both operand A and operand B as determined by the shift indication in order to produce modified significands for operands A and B;

means for detecting, with reference to the exponents of operands A and B, the presence of a leading bit cancellation condition; and means for performing, in the presence of said leading bit cancellation condition, an addition of the modified significands for operands A and B, in order to produce the significand of the result R;

the means for performing an addition further for performing, in the absence of said leading bit cancellation condition, an addition of the significands for operands A and B without using the modified significands produced by the means for performing a shift operation, in order to produce the significand of the result R;

wherein:

said operand B is the result of a multiply operation performed on two floating point operands, and is supplied unrounded as an input to the apparatus such that the result R represents the result of a fused multiply-accumulate operation;

the significand of the result R has N bits and the significand of the operand B has greater than N bits due to being supplied unrounded;

the means for performing an addition is configured to perform injection rounding to add a rounding increment value during the addition; and the operation of the means for performing a shift operation prior to the means for performing an addition is configured to ensure that the modified significands of operands A and B are correctly aligned for the injection rounding; and the means for performing an addition is configured to perform the addition using a first rounding increment value assuming no overflow condition is present and to perform the addition using a second rounding increment value assuming an overflow condition is present.

* * * * *